United States Patent
Takeuchi et al.

(10) Patent No.: US 11,731,825 B2
(45) Date of Patent: Aug. 22, 2023

(54) PACKAGE AND FILM

(71) Applicant: DAIWA CAN COMPANY, Tokyo (JP)

(72) Inventors: Yuji Takeuchi, Sagamihara (JP);
Hiroko Namekawa, Sagamihara (JP);
Takashi Kimiduka, Sagamihara (JP);
Takashi Kanehira, Sagamihara (JP)

(73) Assignee: Daiwa Can Company, Tokyo (JP)

( * ) Notice: Subject to any disclaimer, the term of this patent is extended or adjusted under 35 U.S.C. 154(b) by 491 days.

(21) Appl. No.: 16/829,376

(22) Filed: Mar. 25, 2020

(65) Prior Publication Data

US 2020/0239219 A1 Jul. 30, 2020

Related U.S. Application Data

(63) Continuation of application No. PCT/JP2018/033665, filed on Sep. 11, 2018.

(30) Foreign Application Priority Data

Sep. 29, 2017 (JP) ................................ 2017-190647

(51) Int. Cl.
*B65D 81/00* (2006.01)
*B65D 81/34* (2006.01)
*B65D 75/00* (2006.01)

(52) U.S. Cl.
CPC ....... *B65D 81/3461* (2013.01); *B65D 75/006* (2013.01); *B65D 2205/00* (2013.01)

(58) Field of Classification Search
CPC .............. B65D 81/3461; B65D 75/006; B65D 2205/00

USPC ......................................................... 219/735
See application file for complete search history.

(56) References Cited

U.S. PATENT DOCUMENTS

| 6,102,571 A * | 8/2000 | Moteki ................... B32B 3/266 383/208 |
| 2003/0031763 A1 | 2/2003 | Inagaki et al. |
| 2004/0048081 A1 * | 3/2004 | Hewitt ............... B65D 75/5844 428/521 |

(Continued)

FOREIGN PATENT DOCUMENTS

| CN | 1366506 A | 8/2002 |
| CN | 105377715 A | 3/2016 |

(Continued)

OTHER PUBLICATIONS

Japanese Office Action for Patent Application No. 2017-190647 (with English Translation) dated Aug. 17, 2021 (9 pages).

(Continued)

*Primary Examiner* — Peter N Helvey
(74) *Attorney, Agent, or Firm* — Harness, Dickey & Pierce, P.L.C.

(57) ABSTRACT

A package includes: a film including a crystalline stretched oriented film; and a breaking portion provided in the film and including one or more non-oriented portions formed by heating a part of the crystalline stretched oriented film at a temperature equal to or higher than a melting point of the crystalline stretched oriented film and facing each other with an oriented portion of the crystalline stretched oriented film interposed therebetween.

8 Claims, 11 Drawing Sheets

(56) References Cited

U.S. PATENT DOCUMENTS

| | | | | |
|---|---|---|---|---|
| 2004/0252920 | A1* | 12/2004 | Moteki | B65D 75/58 383/200 |
| 2012/0308690 | A1 | 12/2012 | Holmen | |
| 2015/0166241 | A1* | 6/2015 | Huffman | B65D 81/3453 219/735 |
| 2015/0210463 | A1 | 7/2015 | Iguchi et al. | |
| 2016/0152399 | A1 | 6/2016 | Inagaki et al. | |

FOREIGN PATENT DOCUMENTS

| | | |
|---|---|---|
| JP | 10-287361 | 10/1998 |
| JP | 11-139466 A | 5/1999 |
| JP | 2002-059982 A | 2/2002 |
| JP | 3942709 B2 | 7/2007 |
| JP | 4817583 B2 | 11/2011 |
| JP | 2015-13441 A | 1/2015 |
| JP | 2017-071430 A | 4/2017 |
| WO | WO-0181201 A1 | 11/2001 |
| WO | 2012-086295 A1 | 6/2012 |
| WO | 2014-061651 A1 | 4/2014 |
| WO | 2015-002058 A1 | 1/2015 |

OTHER PUBLICATIONS

International Search Report for PCT/JP2018/033665 dated Dec. 11, 2018 (w/ English translation) (4 pages).
Chinese Office Action for Application No. 201880062941.4 dated Jun. 1, 2021 with English translation (18 pages).
Extended European Search Report for corresponding Application No. EP 18862701.2 dated May 11, 2021 (8 Pages).
English translation of International Preliminary Report on Patentability for International Application No. PCT/JP2018/033665 dated Mar. 31, 2020 (7 Pages).
Chinese Office Action dated May 31, 2022 (with English tranlsation) for Application No. 201880062941.4 (13 pages).
Second Chinese Office Action for corresponding Application No. 201880062941.4 dated Feb. 21, 2022, with English translation (19 Pages).
Bian ying Wan et al., Second Edition of "Polymer Material Processing", Jun. 30, 2016 (12 Pages).(The relevancy of this article is that it was cited in a counterpart Chinese office action for application No. 201880062941.4 dated Feb. 21, 2022, which is enclosed herewith.).
Taiwanese Office Action dated Nov. 2, 2021 for Taiwanese Application No. 107133284 with English translation (12 pages).

* cited by examiner

| | Shape of non-oriented portion | Proximity part | Short side | Long side | Proximity distance | Result of steam releasing | Width of steam port |
|---|---|---|---|---|---|---|---|
| Example 1 | In the same straight line | Respective short sides | 2mm | 15mm | 2mm | ○ | 4mm |
| Example 2 | In the same straight line | Respective short sides | 2mm | 15mm | 1mm | ○ | 2mm |
| Example 3 | In the same straight line | Respective short sides | 2mm | 15mm | 4mm | ○ | 8mm |
| Example 4 | In the same straight line | Respective short sides | 2mm | 8mm | 2mm | ○ | 4mm |
| Example 5 | In the same straight line | Respective short sides | 2mm | 20mm | 1mm | ○ | 2mm |
| Example 6 | In the same straight line | Respective short sides | 2mm | 20mm | 1mm | ○ | 3mm |
| Example 7 | In the same straight line | Respective short sides | 2mm | 20mm | 1mm | ○ | 2mm |
| Comparative Example 1 | In the same straight line | Respective short sides | 2mm | 15mm | 5mm | × | — |
| Example 8 | Axis displaced | Respective short sides | 2mm | 15mm | 1mm | ○ | 4mm |

FIG. 11

| | Shape of non-oriented portion | | Proximity part | Short side | Long side | Proximity distance | Result of steam releasing | Width of steam port |
|---|---|---|---|---|---|---|---|---|
| Example 9 | 135° | 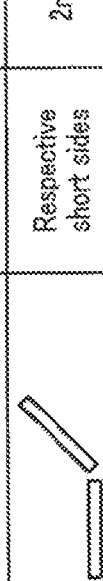 | Respective short sides | 2mm | 15mm | 2mm | ○ | 5mm |
| Example 10 | 90° |  | Respective short sides | 2mm | 15mm | 2mm | ○ | 5mm |
| Example 11 | Short side, long side 90° | 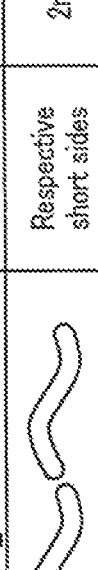 | Short side, long side | 2mm | 15mm | 1mm | ○ | 5mm |
| Example 12 | Wavy line |  | Respective short sides | 2mm | 20mm | 2mm | ○ | 5mm |
| Example 13 | Single line |  | Respective short sides | 1.5mm | 60mm | 1mm | ○ | 2mm |
| Comparative Example 2 | — | | None | 2mm | 15mm | — | × | — |
| Comparative Example 3 | Respective long sides |  | Respective long sides | 2mm | 15mm | 1mm | × | — |
| Comparative Example 4 | Respective long sides |  | Respective long sides | 2mm | 8mm | 1mm | × | — |
| Comparative Example 5 | Short sides = Long sides |  | Respective short sides = long sides | 5mm | 5mm | 1mm | × | — |

FIG. 12

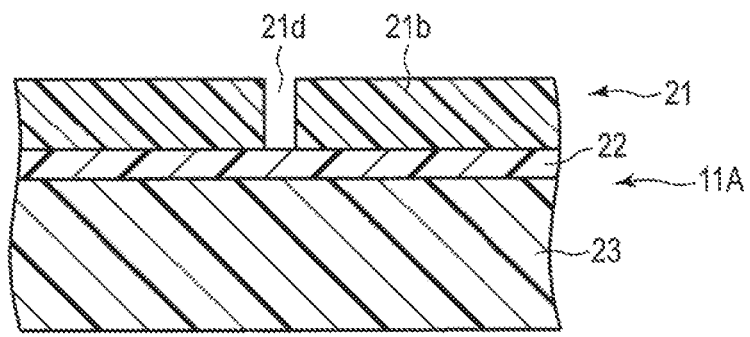
F I G. 13
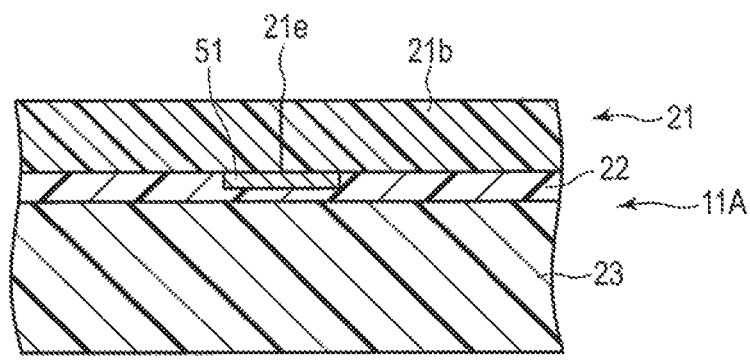
F I G. 14

PACKAGE AND FILM

CROSS-REFERENCE TO RELATED APPLICATIONS

This is a Continuation Application of PCT application No. PCT/JP2018/033665, filed Sep. 11, 2018, which was published under PCT Article 21(2) in Japanese.

This application is based upon and claims the benefit of priority from Japanese Patent Application No. 2017-190647, filed Sep. 29, 2017, the entire contents of which are incorporated herein by reference.

BACKGROUND

Field

The present invention relates to a package and a film for containing content to be heated in a microwave oven.

Description of the Related Art

There is known a package to be heated by a microwave oven with its content contained and sealed therein. However, when the content of the package is heated by a microwave oven, an internal pressure increases. For this reason, there is also known a package provided with means for automatically discharging steam in the package during microwave oven heating to reduce an internal pressure of the package.

For example, Japanese Patent No. 3942709 discloses a package in which a laminate-structure film having a base film and a first sealant layer is provided with a through-hole, and further provided with a second sealant layer by extrusion-coating of linear low-density polyethylene or the like on the first sealant layer side. In this package, when the internal pressure increases due to microwave oven heating, the second sealant layer in the portion provided with the through-hole expands outwards and bursts, and a hole is opened, thereby releasing the steam in the package.

In addition, for example, Jpn. Pat. Appln. KOKAI Publication No. 2015-13441 discloses a package formed by a laminate-structure film having a heat-sealable sealing layer and an outer layer, in which the package is provided with a fragilely processed portion where a part of the outer layer is linearly removed with a laser. When the internal pressure of the package increases due to microwave oven heating, a tear is formed along the fragilely processed portion, and a minute hole is formed through which the inner layer film passes in the thickness direction, thereby releasing the steam in the package.

Furthermore, Japanese Patent No. 4817583 discloses a package including an oriented film made of synthetic resin, in which a cutting line is provided over a zone coated with a release agent and a zone not coated with the release agent, and a sealant film is affixed to the surface coated with the release agent. In this package, when the internal pressure increases due to microwave oven heating, the sealant film in the zone coated with the release agent below the cutting line of the oriented film is freely extended and expanded to the cutting line, but the zone not coated with the release agent cannot be freely extended and expanded. Thus, during the heating, stresses are concentrated at the boundary between the cutting line and the zone not coated with the release agent of the sealant film, and a small hole is formed in the sealant film, thereby releasing the steam in the package.

BRIEF SUMMARY OF THE INVENTION

The above-mentioned packages have structures for removing or cutting a part of the exterior, and therefore, there is a problem that gas barrier properties for oxygen or the like are reduced. Reduction in gas barrier properties for oxygen or the like tends to have a particularly large influence when a high barrier film, such as a vapor deposition film, a gas barrier coat film, or a film using a gas barrier resin, is used as a base film. For this reason, there is a demand for a package, with no through-hole or cutting line in the base film, that is capable of stably releasing the internal pressure that increased due to the water vapor generated during microwave oven heating.

Therefore, an aspect of the present invention is to provide a package and a film that can stably release the internal pressure during microwave oven heating.

According to one aspect of the present invention, a package includes: a film including a crystalline stretched oriented film; and a breaking portion provided in the film, and including one or more non-oriented portions formed by heating a part of the crystalline stretched oriented film at a temperature equal to or higher than a melting point of the crystalline stretched oriented film and facing each other with an oriented portion of the crystalline stretched oriented film interposed therebetween.

According to one aspect of the present invention, a film includes: a crystalline stretched oriented film; and a breaking portion including one or more non-oriented portions formed by heating a part of the crystalline stretched oriented film at a temperature equal to or higher than a melting point of the crystalline stretched oriented film and facing each other with an oriented portion of the crystalline stretched oriented film interposed therebetween.

BRIEF DESCRIPTION OF THE DRAWINGS

FIG. 11 shows results of Evaluation Test 1 on the package;

FIG. 12 shows results of Evaluation Test 1 on the package;

FIG. 13 is a cross-sectional view illustrating a layer structure of a film of a comparative example used for Evaluation Test 2 on the package;

FIG. 14 is a cross-sectional view illustrating a layer structure of a film of a comparative example used for Evaluation Test 2 on the package;

DETAILED DESCRIPTION

First Embodiment

Figure 1:
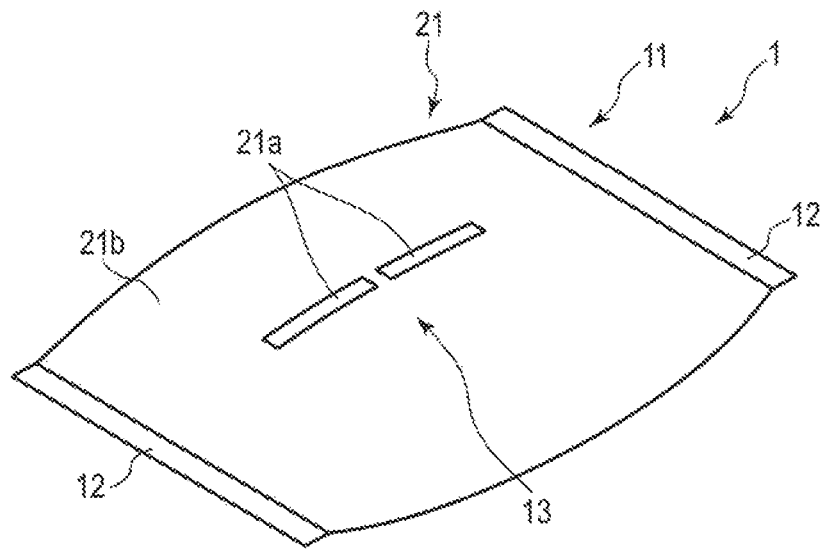
FIG. 1 is a perspective view illustrating a structure of a package according to a first embodiment of the present invention.
Figure 2:
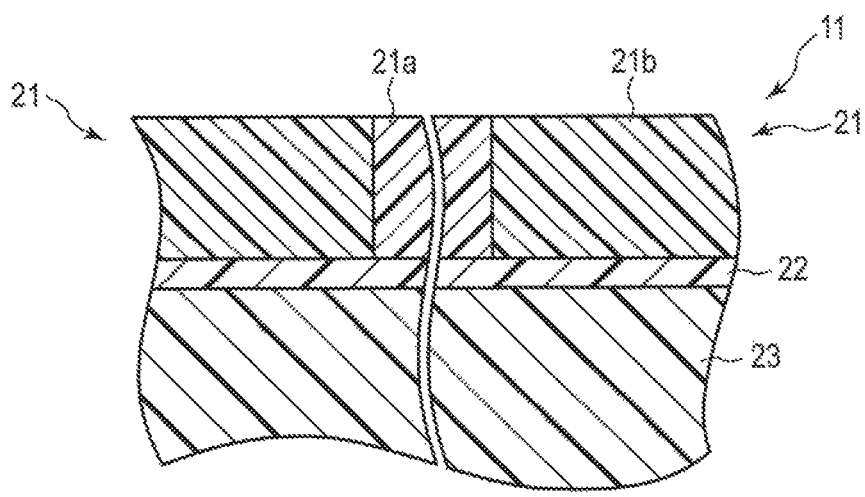
FIG. 2 is a cross-sectional view schematically illustrating a layer structure of a film used for the package.
Figure 3:
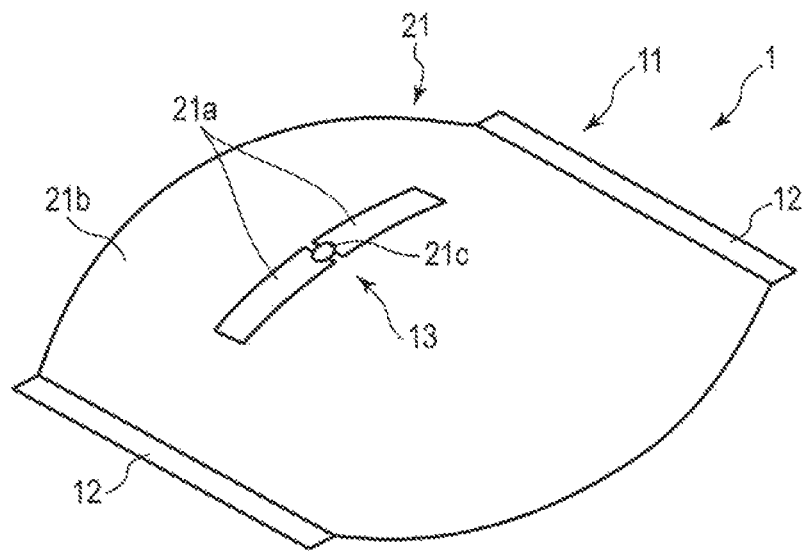
FIG. 3 is a perspective view illustrating an example of use of the package.

With reference to FIGS. 1 to 3, a package 1 using a film 11 according to the first embodiment of the present invention will be described.

FIG. 1 is a perspective view illustrating a structure of the package 1 according to the first embodiment of the present invention, and FIG. 2 is a cross-sectional view schematically illustrating a layer structure of the film 11 used for the package 1. FIG. 3 is a perspective view illustrating a state where the package 1 was heated by a microwave oven.

As shown in FIG. 1, the package 1 is a packaging container for microwave oven heating, in which the film 11, having a multilayer structure with a crystalline stretched oriented film 21 on an outer surface side, is formed into a bag shape. The package 1 is, for example, a pillow packaging bag formed by containing content in the bag-shaped film 11 and sealing an end with a sealing portion 12.

As a specific example, the package 1 includes the film of the laminated structure having the crystalline stretched oriented film 21 on the outer surface side, the sealing portion 12 obtained by forming the film 11 into a bag shape and sealing the end, and a breaking portion 13 that is provided in the film 11 and breaks when an internal pressure increases. The content referred to here contains moisture heated by a microwave oven, such as food heat-cooked by a microwave oven, or a towel heated by a microwave oven.

The film 11 is formed in, for example, a rectangular shape formable in a bag shape. As shown in FIG. 2, the layer structure of the film 11 includes the crystalline stretched oriented film 21, an adhesive layer 22, and a sealant film 23, from the outer surface side of the package 1 when formed. The crystalline stretched oriented film 21 includes a non-oriented portion 21a formed by heating a part to a temperature equal to or higher than the melting point. The non-oriented portion 21a constitutes a part of the breaking portion 13. The non-oriented portion 21a is formed into various shapes depending on the structure of the breaking portion 13.

The crystalline stretched oriented film 21 is formed of a general biaxially stretched film such as a biaxially stretched PET film, a biaxially stretched NY film, or a biaxially stretched PP film. Other suitable examples of the crystalline stretched oriented film 21 include a biaxially stretched film having barrier properties such as a biaxially stretched PVA film or a biaxially stretched EVOH film, and a coextruded biaxially stretched film having a barrier resin of PP/EVOH/PP, NY/EVOH/NY, NY/MXD-NY/NY or the like as an intermediate layer. In addition, a film obtained by coating a general biaxially stretched film with a PVA-based or PVDC or PAA-based barrier resin, or a hybrid coat film in which an inorganic substance is dispersed in the aforementioned barrier resin, can also be suitably used for the crystalline stretched oriented film 21. The thickness of the crystalline stretched oriented film 21 is preferably 12 μm or more and 50 μm or less.

This is because if the crystalline stretched oriented film 21 has a thickness of less than 12 μm, the physical strength of the package 1 may be lowered, and film formation is technically difficult, which increases costs. Further, if the thickness of the crystalline stretched oriented film 21 exceeds 50 μm, the film 11 including the crystalline stretched oriented film 21 less easily stretches.

The non-oriented portion 21a is formed by heating the crystalline stretched oriented film 21 to a temperature equal to or higher than the melting point to eliminate orientation. That is, the crystalline stretched oriented film 21 of the film 11 has the non-oriented portion 21a in a part of an oriented portion 21b that is not heated to the melting point or higher and that has orientation.

For a method of heating the crystalline stretched oriented film 21 to form the non-oriented portion 21a in the crystalline stretched oriented film 21, it is preferable to use a method such as hot plate heating, impulse heating, laser light heating, near infrared heating, etc. For example, for the hot plate heating or the impulse heating, it is preferable that a pressing head portion be subjected to a treatment such as a Teflon (registered trademark) surface treatment so that a part of the melted resin of the crystalline stretched oriented film 21 or the sealant film 23 does not adhere to the pressing head portion. For example, for the hot plate heating, a pressing head (hot plate) whose temperature is set to be equal to or higher than the melting point of the crystalline stretched oriented film 21 is applied to the crystalline stretched oriented film 21 to melt and heat it, thereby forming the non-oriented portion 21a.

Laser light heating and near-infrared heating have an advantage that the crystalline stretched oriented film 21 can be heated in a non-contact manner, but laser light heating is preferable because heating can be applied locally. In addition, if the crystalline stretched oriented film 21 to be used has poor absorption of laser light and formation of the non-oriented portion 21a is difficult, the materials of the crystalline stretched oriented film 21 may be previously blended with a laser light absorbing material that improves laser light absorption of the crystalline stretched oriented film 21, or the crystalline stretched oriented film 21 may be coated with the laser light absorbing material.

Further, in regard to types of laser light, it is preferable to use a carbon dioxide gas laser for which most of the resin materials used for the crystalline stretched oriented film 21 have relatively high absorptivity. The laser light absorbing material can be appropriately selected depending on the type of laser light. These heating methods can be appropriately selected depending on materials, etc. of the crystalline stretched oriented film 21 to be used.

In addition, whether the formed non-oriented portion 21a has been appropriately formed to be non-oriented can be determined by inspecting the formed crystalline stretched oriented film 21. For this inspection method, a crystallinity measurement by X-ray diffraction, FT-IR, DSC, etc., an orientation viewer using a polarizing plate, and the like, may be used.

For the crystalline stretched oriented film 21, the breaking elongation of the oriented portion 21b is set to 200% or less, while the breaking elongation of the non-oriented portion 21a is set to 300% or more.

The adhesive layer 22 can be appropriately selected and used from dry laminating adhesives for general food use. However, since the package 1 is used for microwave oven heating, it is preferable that the adhesive layer 22 have heat resistance. The thickness of the adhesive layer 22 is preferably 2 μm to 5 μm from the viewpoint of performance and economy.

The sealant film 23 is formed by, for example, a non-stretched low-density polyethylene (LDPE) film, a non-stretched linear low-density polyethylene (LLDPE) film, a non-stretched polypropylene (PP) film, a non-stretched polyethylene terephthalate film, or the like. The thickness of the sealant film 23 is preferably 10 μm or more and 100 μm or less. The thickness of the sealant film 23 is more preferably 20 μm or more and 60 μm or less.

This is because if the thickness of the sealant film 23 is less than 10 μm, the sealing strength is lowered, and the sealing portion 12 may be broken before the breaking portion breaks due to microwave oven heating. Further, if the thickness of the sealant film 23 exceeds 100 μm, it stretches less easily, which may cause a problem in certainty of steam releasing.

The sealing portion 12 is formed by heat-sealing the film 11 at its end.

The breaking portion 13 is provided in a part of the film 11, extends in a straight or curved line shape, and is provided singularly. The breaking portion 13 is formed by providing a single non-oriented portion 21a in such a manner that two of its own sections face each other with a predetermined gap, or by providing a plurality of non-oriented portions 21a to face each other. That is, the breaking portion 13 is formed in such a manner that a part of the non-oriented portion 21a faces each other with the oriented portion 21b interposed therebetween, wherein the oriented portion 21b is not heated at a temperature equal to or higher than the melting point of the crystalline stretched oriented film 21, i.e., with the oriented portion 21b having the orientation of the crystalline stretched oriented film 21 interposed therebetween.

As a specific example, as shown in FIGS. 4 to 10, the non-oriented portion 21a has short sides and long sides, and one or more non-oriented portions 21a are provided. When one non-oriented portion 21a is provided, its own short sides face each other with a predetermined gap therebetween, or its own short and long sides face each other with a predetermined gap therebetween. When two non-oriented portions 21a are provided, the respective short sides of the two non-oriented portions 21a face each other with a predetermined gap therebetween, or the short side of one non-oriented portion 21a and the long side of the other non-oriented portion 21a face each other with a predetermined gap therebetween. Similarly, when three or more non-oriented portions 21a are provided, the respective short sides or the short and long sides of any two of the non-oriented portions 21a or three or more of the non-oriented portions 21a face each other with a predetermined gap therebetween. When a plurality of non-oriented portions 21a are provided in the breaking portion 13, the non-oriented portions 21a preferably have the same size and shape, but may have different sizes and shapes as long as the breaking portion 13 is breakable.

Specifically, the breaking portion 13 is formed by bringing one or more non-orientation portions 21a, which are obtained by heating the crystalline stretched oriented film 21, close to each other with a gap of a predetermined distance, with the oriented portion 21b having orientation of the crystalline stretched oriented film 21 interposed therebetween. The predetermined distance can be appropriately set as long as the breaking portion 13 breaks during microwave oven heating, but the distance is preferably less than 5 mm. Further, the long side and the short side are not limited to a straight line, and may be a curved line. That is, the breaking portion 13 may be formed in a shape in which the non-oriented portion 21a extends in any one direction, and one end of one non-oriented portion 21a faces another section of the same non-oriented portion 21a or a part of another non-oriented portion 21a with a predetermined gap therebetween. Note that as long as a steam port 21c can be formed, the oriented portion 21b between the facing non-oriented portions 21a may be partially non-oriented.

The shape of one non-oriented portion 21a may be an annular shape or a polygonal annular shape in which a part is cut off. Two non-oriented portions 21a may be formed linearly, for example, and may be formed such that the respective short sides face each other linearly or to intersect each other at a predetermined angle, or such that the short side and the long side face each other in a T shape. In addition, the two non-oriented portions 21a may be formed to have a wavy form or the like in addition to the linear form.

Figure 4:
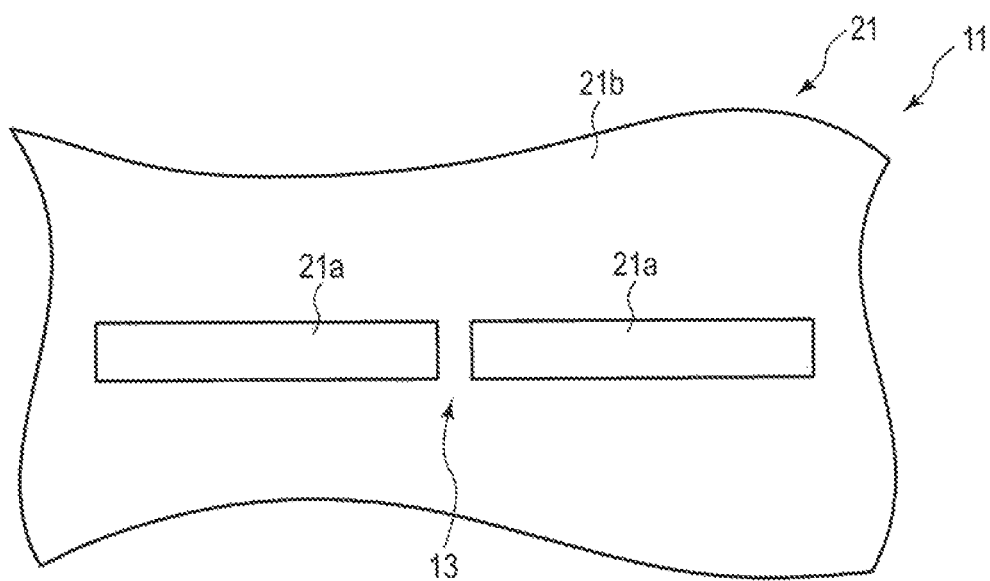
FIG. 4 is a plan view illustrating a structure of a breaking portion of a package in which a pair of non-oriented portions of Examples 1 to 7 and Comparative Example 1 is arranged.

In light of the manufacturing costs, etc., it is preferable that a pair of non-oriented portions 21a be formed in a rectangular shape longer in one direction with respective short sides facing each other, as shown in FIG. 4. For the non-oriented portions 21a shown in FIG. 4, it is preferable that the short side length be in the range of 0.5 to 10 mm and the long side length be in the range of 3 to 100 mm and that the short side length be shorter than the long side length, and they are appropriately selected depending on the size of the bag and the structure of the laminate. The distance between the short sides facing each other of the two non-oriented portions 21a is set to less than 5 mm, more preferably 0.5 to 3.0 mm, and the distance is appropriately selected depending on the size of the bag and the structure of the laminate.

This is because if the dimension of the non-oriented portion 21a is less than the above-stated range, steam releasing may not be successfully activated due to the stretch range being too narrow, and if the dimension of the non-oriented portion 21a exceeds the range, the influence of a decrease in the strength of the bag and a decrease in the gas barrier property may increase. In addition, if the distance between the facing short sides of the two non-oriented portions 21a is less than the above-stated range, the distal ends of the linear non-oriented portions facing each other may be integrated and the steam port 21c may not be formed, resulting in a bursting of the package 1, and if the distance exceeds the range, the region between the facing short sides of the two non-oriented portions 21a may not stretch, and therefore, the breaking portion 13 may not break, and the steam port 21c may not be formed, resulting in a bursting of the package 1.

Next, a method of manufacturing and using the package 1 will be described.

First, a part of the film 11 is heated to a temperature equal to or higher than the melting point of the crystalline stretched oriented film 21 to eliminate orientation in a part of the crystalline stretched oriented film 21, thereby forming a non-oriented portion 21a having a predetermined shape. As a specific example, a part of the film 11 is irradiated with laser light such as a carbon dioxide gas laser at an output of the melting point of the crystalline stretched oriented film 21 or higher. Next, laser light is scanned in a form of the non-oriented portion 21a to be formed. For example, if a pair of non-oriented portions 21a is formed, laser light is scanned in the form of one of the non-oriented portions 21a, and thereafter the laser light irradiation is stopped, and then the position where the other non-oriented portion 21a is formed is irradiated with the laser light. Next, the laser light is scanned in the form of the other non-oriented portion 21a. Through these steps, a part of the film 11 is heated to form the non-oriented portions 21a.

Next, the film 11 is formed into a bag shape, and the content is disposed inside the bag. Next, the end of the film is heat-sealed to form the sealing portion 12, thereby forming the sealed bag-like package 1.

The package 1 containing the content is placed in a microwave oven, and the content is heated by the microwave oven. When the content is heated by the microwave oven, steam is generated from the content, and the internal pressure increases, resulting in expansion of the package 1 and stretching of the film 11. When the film 11 stretches, a portion between the short sides facing each other of the non-oriented portion 21a of the breaking portion 13 shown in FIG. 3 breaks, or a portion between the short side and the long side facing each other breaks; thus, the steam of the package 1 escapes outside, the internal pressure decreases, and the steam is released.

Next, a description will be given of functions in which the breaking portion 13 breaks and the steam is discharged from the package 1. When the package 1 packaging moisture-containing content is heated in a microwave oven, water vapor is generated from the content, and the internal pressure increases, resulting in expansion of the package 1. At this time, because LDPE, LLDPE, CPP and the like used for the sealant film 23 are usually non-stretched, that is, non-oriented, the tensile strength is lower than the stretched film, and the breaking elongation value is higher. On the other hand, the crystalline stretched oriented film 21 generally has a high tensile strength and a low breaking elongation value, and therefore the film 11 obtained by bonding the crystalline stretched oriented film 21 and the sealant film 23 does not easily stretch.

However, the non-oriented portion 21a of the crystalline stretched oriented film 21 is a non-oriented region in which the crystalline stretched oriented film 21 is in a non-oriented state, and therefore the tensile strength is lower than that of an oriented region which is the oriented portion 21b of the crystalline stretched oriented film 21. For this reason, when the package 1 expands and the film 11 stretches due to increase in the internal pressure, the film 11 in the region of the non-oriented portion 21a stretches in the width direction because of the stress concentration.

At this time, the film 11 in the region of the oriented portion 21b located between the facing short sides or between the facing short and long sides of the non-oriented portion 21a also stretches following the stretching of the region of the non-oriented portion 21a, but the region of the non-oriented portion 21a has a higher breaking elongation value. As a result, when the film 11 stretches to some extent, because of the breaking elongation difference, the film breaks earlier in the region including the oriented portion 21b located between the facing short sides or between the facing short and long sides of the non-oriented portions 21a, and a small hole for discharging water vapor is generated. Using the small hole as the steam port 21c, steam is discharged from the package 1.

According to the package 1 formed as described above, the breaking portion 13 is provided in which the short sides or the short and the long side of the non-oriented portions 21a are arranged in the film 11 with the oriented portion 21b having a predetermined width interposed therebetween, and the breaking portion 13 breaks during microwave oven heating, releasing the steam. In addition, by providing the breaking portion 13 in a portion on the upper side of the package 1 when the package 1 is placed in the microwave oven, that is, providing the breaking portion 13 on the upper surface of the package 1, it is possible to prevent the content from leaking from the steam port 21c generated when the breaking portion 13 breaks.

For example, if the package 1 contains food having a large amount of liquid as content, it is possible to prevent the liquid from leaking outside by providing the breaking portion 13 on the surface that is located on the upper side when the package 1 is placed in the microwave oven because the portion, where the breaking portion 13 breaks and the steam port 21c is formed, is the upper surface of the package 1 when placed in the microwave oven. However, if a liquid may leak such as a case where the package 1 is heated by a microwave oven by placing it on a dish, the breaking portion 13 may be provided on the lower surface side or the side surface side of the package 1.

In addition, by providing the breaking portion 13 in the vicinity of the center of the upper surface of the package 1, it is possible to prevent the sealing portion 12 from being heated by steam discharged at the time of breaking. That is, when taking the package 1 after the microwave oven heating, a user often picks up the sealing portion 12, and because the sealing portion 12 is not heated by the steam, it is possible to prevent the sealing portion 12 from becoming hot, and the user can take the package 1 by picking up the sealing part 12, which provides good usability. However, the breaking portion 13 is not limited to being provided at the central portion of the package 1, and the portion can be set as appropriate depending on the use aspect, and for example, by defining a portion where the user picks up when taking the package 1 based on the shape of the package 1 or the shape of the sealing portion 12, the breaking portion 13 can be disposed so as to avoid this portion.

Next, a description will be given of Evaluation Tests 1 and 2 for the package 1 using the film 11 formed as described above, and the evaluation results thereof. The evaluation test is for making characteristics of the present invention more concrete, and the scope of the present invention is not limited to the following examples. FIGS. 4 and 11 are schematic diagrams of the shape and arrangement of the non-oriented portions 21a in Evaluation Test 1.

Evaluation Test 1

In Examples 1 to 13 and Comparative Examples 1 to 5 described below, the package 1 was prepared by packaging inside a tissue that was soaked in 10 g of tap water. Next, the package 1 was heated in a microwave oven (Hitachi, Ltd.: MRO-MS7) under the condition of an output of 500 W. A package in which the steam port 21c was formed by breakage of the breaking portion 13 was evaluated as ○, and a package in which the steam port 21c was not formed and another portion was broken was evaluated as x. In addition, the maximum width of the steam port 21c was measured.

For the package 1 used, the non-oriented portion 21a of each produced package 1 was identified, and it was confirmed that the non-oriented portion 21a was generated.

Example 1

In Example 1, the package 1 and the film 11 having the following structures were used. For the crystalline stretched oriented film 21, a biaxially stretched PET film (TOYOBO CO., LTD.: E5100) having a thickness of 12 μm was used. For the sealant film 23, an LLDPE film (TOYOBO CO., LTD.: L4102) having a thickness of 40 μm was used. For the adhesive layer 22, a urethane-based dry laminate adhesive was used to bond the crystalline stretched oriented film 21 and the sealant film 23, and aging was carried out in a thermostatic chamber at 38° C. for 3 days to prepare a film 11 shown in FIG. 1.

The crystalline stretched oriented film 21 of the film 11 was heated at a position near the center on the upper surface side of the package 1 by a carbon dioxide laser to form a pair of non-oriented portions 21*a* as shown in FIG. 4. The non-oriented portions 21*a* were formed in a rectangular shape that is long in one direction with a long side of 15 mm and a short side of 2 mm, and the pair of non-oriented portions 21*a* were arranged linearly such that the respective short sides face each other on the same axis. The distance between the facing short sides of the pair of non-oriented portions 21*a* (proximity distance) was 2 mm.

Using this film 11, a pillow packaging bag having a size of 160 mm×260 mm as shown in FIG. 1 was prepared as the package 1.

Example 2

The package 1 and the film 11 of Example 2 had the following structures. The materials of the crystalline stretched oriented film 21, the adhesive layer 22, and the sealant film 23 as well as the shapes of the non-oriented portion 21*a* and the package 1 were the same as those in Example 1, but the distance between the facing short sides of the pair of non-oriented portions 21*a* (proximity distance) was 1 mm.

Example 3

The package 1 and the film 11 of Example 3 had the following structures. The materials of the crystalline stretched oriented film 21, the adhesive layer 22, and the sealant film 23 as well as the shapes of the non-oriented portion 21*a* and the package 1 were the same as those in Examples 1 and 2, but the distance between the facing short sides of the pair of non-oriented portions 21*a* (proximity distance) was 4 mm.

Example 4

The package 1 and the film 11 of Example 4 had the following structures. The materials of the crystalline stretched oriented film 21, the adhesive layer 22, and the sealant film 23 as well as the shape of the package 1 were the same as those in Examples 1 to 3, but the non-oriented portions 21*a* were formed with a long side of 8 mm and a short side of 2 mm, and a distance between the facing short sides of the pair of non-oriented portions 21*a* (proximity distance) was 2 mm.

Example 5

The package 1 and the film 11 of Example 5 had the following structures. The materials of the crystalline stretched oriented film 21, the adhesive layer 22, and the sealant film 23 as well as the shape of the package 1 were the same as those in Examples 1 to 4, but the non-oriented portions 21*a* were formed with a long side of 20 mm and a short side of 2 mm, and a distance between the facing short sides of the pair of non-oriented portions 21*a* (proximity distance) was 1 mm.

Example 6

The package 1 and the film 11 of Example 6 had the following structures. The materials of the crystalline stretched oriented film 21 and the adhesive layer 22, the shape of the non-oriented portions 21*a*, the distance between the facing short sides of the pair of non-oriented portions 21*a* (the proximity distance), and the shape of the package 1 were the same as those in Example 5, but for the sealant film 23, cast polypropylene (CPP) (TOYOBO CO., LTD.: P1128) having a thickness of 30 μm was used.

Example 7

The package 1 and the film 11 of Example 7 had the following structures. The material of the adhesive layer 22, the shape of the non-oriented portions 21*a*, the distance between the facing short sides of the pair of non-oriented portions 21*a* (proximity distance), and the shape of the package 1 were the same as those in Example 5. For the crystalline stretched oriented film 21, a biaxially stretched PP film (Mitsui Chemicals Tohcello, Inc.: OP U-1) having a thickness of 20 μm was used. For the sealant film 23, a milky white polyethylene film (SEKISUI FILM CO., LTD.: Lamilon 2-CWW) having a thickness of 30 μm was used. Further, a pair of non-oriented portions 21*a* was formed by applying a hot plate to the crystalline stretched oriented film 21 of the film 11 at a position near the center on the upper surface side of the package 1.

Example 8

In Example 8, the package 1 and the film 11 having the following structures were used. The materials of the crystalline stretched oriented film 21, the adhesive layer 22, and the sealant film 23 as well as the shape of the package 1 were the same as those in Example 1.

Figure 5:
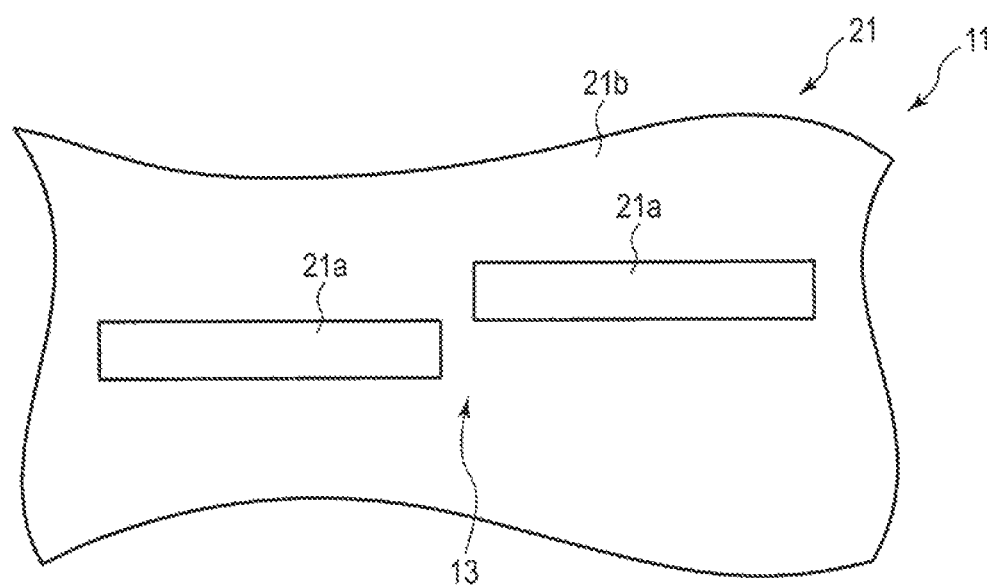
FIG. 5 is a plan view illustrating a structure of a breaking portion of a package in which a pair of non-oriented portions of Example 8 is arranged.

The non-oriented portions 21*a* were formed in a rectangular shape that is long in one direction with a long side of 15 mm and a short side of 2 mm, and as shown in FIG. 5, the pair of non-oriented portions 21*a* was arranged linearly such that the center axis of the non-oriented portions 21*a* along the longitudinal direction was displaced in a direction orthogonal to the axis and the longitudinal direction was the same. The distance between the facing short sides of the pair of non-oriented portions 21*a* (proximity distance) was 1 mm. Here, the proximity distance was a distance obtained by connecting the centers of the short sides of the pair of non-oriented portions 21*a*.

Example 9

In Example 9, the package 1 and the film 11 having the following structures were used. The materials of the crystalline stretched oriented film 21, the adhesive layer 22, and the sealant film 23 as well as the shape of the package 1 were the same as those in Example 1.

Figure 6:
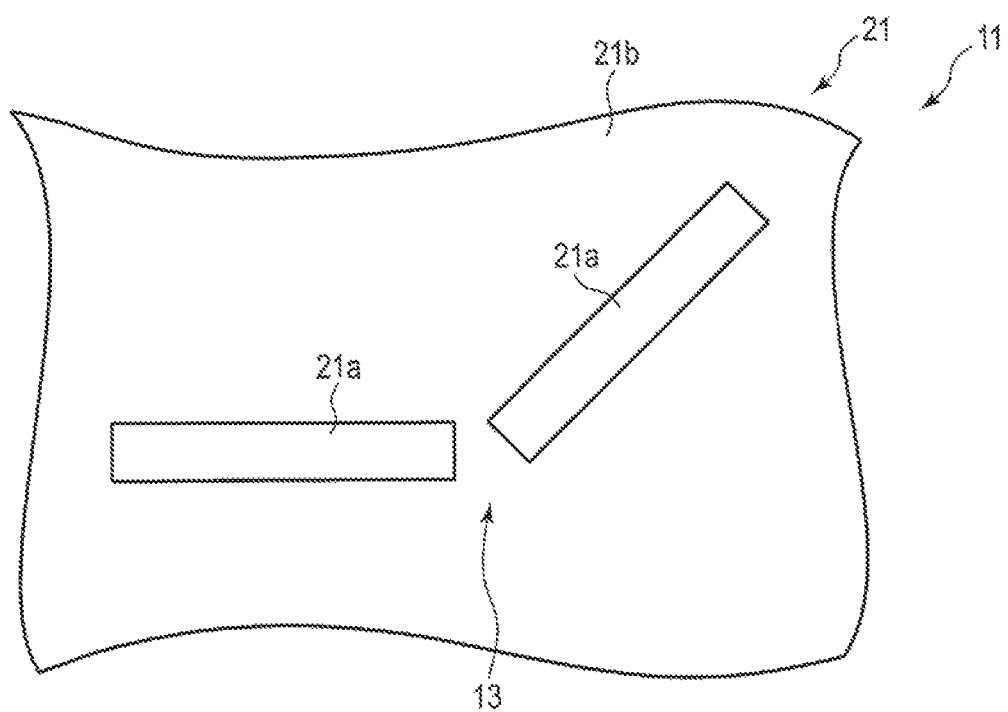
FIG. 6 is a plan view illustrating a structure of a breaking portion of a package in which a pair of non-oriented portions of Example 9 is arranged.

The non-oriented portions 21*a* were formed in a rectangular shape that is long in one direction with a long side of 15 mm and a short side of 2 mm. Further, as shown in FIG. 6, the pair of non-oriented portions 21*a* was formed in such a manner that one non-oriented portion 21*a* was turned 135 degrees with respect to the other non-oriented portion 21*a*, and the distance between the facing short sides of the pair of non-oriented portions 21*a* (proximity distance) was 2 mm.

Here, the proximity distance was a distance obtained by connecting the centers of the short sides of the pair of non-oriented portions 21a.

Example 10

In Example 10, the package 1 and the film 11 having the following structures were used. The materials of the crystalline stretched oriented film 21, the adhesive layer 22, and the sealant film 23 as well as the shape of the package 1 were the same as those in Example 1.

Figure 7:
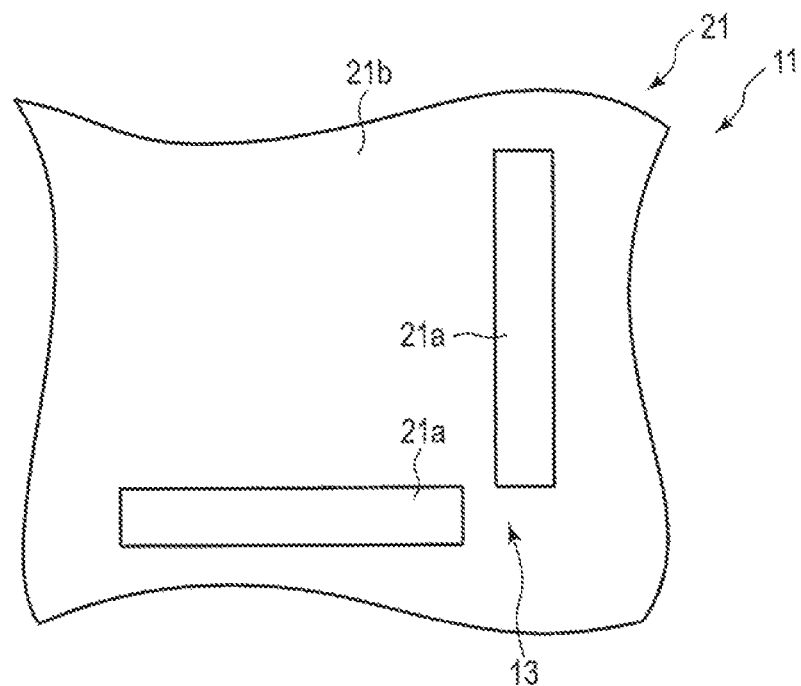
FIG. 7 is a plan view illustrating a structure of a breaking portion of a package in which a pair of non-oriented portions of Example 10 is arranged.

The non-oriented portions 21a were formed in a rectangular shape that is long in one direction with a long side of 15 mm and a short side of 2 mm. Further, as shown in FIG. 7, the pair of non-oriented portions 21a was formed in such a manner that one non-oriented portion 21a was turned 90 degrees with respect to the other non-oriented portion 21a, and the distance between the facing short sides of the pair of non-oriented portions 21a (proximity distance) was 2 mm. Here, the proximity distance was a distance obtained by connecting the centers of the short sides of the pair of non-oriented portions 21a.

Example 11

In Example 11, the package 1 and the film 11 having the following structures were used. The materials of the crystalline stretched oriented film 21, the adhesive layer 22, and the sealant film 23 as well as the shape of the package 1 were the same as those in Example 1.

Figure 8:
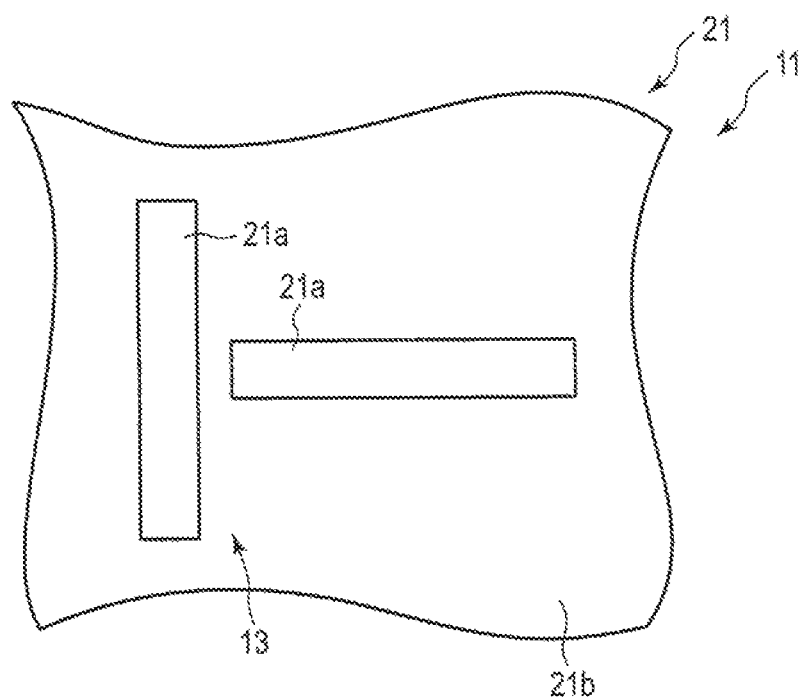
FIG. 8 is a plan view illustrating a structure of a breaking portion of a package in which a pair of non-oriented portions of Example 11 is arranged.

The non-oriented portions 21a were formed in a rectangular shape that is long in one direction with a long side of 15 mm and a short side of 2 mm. Further, as shown in FIG. 8, the pair of non-oriented portions 21a was formed in such a manner that one non-oriented portion 21a was turned 90 degrees with respect to the other non-oriented portion 21a, the short side of one non-oriented portion 21a faced the center of the long side of the other non-oriented portion 21a, and the distance between the facing short and long sides (proximity distance) was 1 mm. Here, the proximity distance was a shortest distance from the center of the short side to the long side of the pair of non-oriented portions 21a.

Example 12

In Example 12, the package 1 and the film 11 having the following structures were used. The materials of the crystalline stretched oriented film 21, the adhesive layer 22, and the sealant film 23 as well as the shape of the package 1 were the same as those in Example 1.

Figure 9:
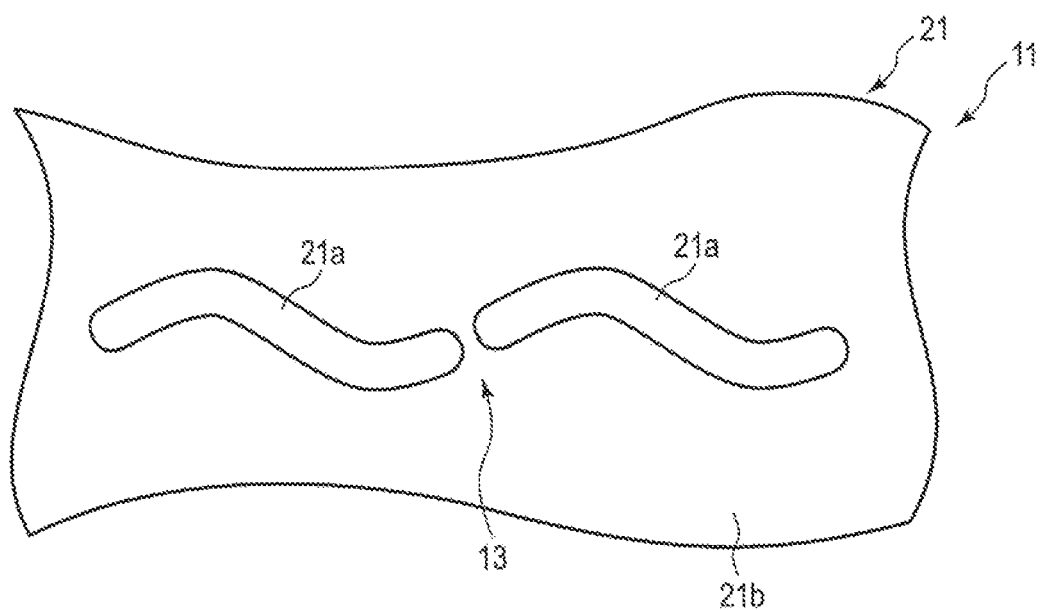
FIG. 9 is a plan view illustrating a structure of a breaking portion of a package in which a pair of non-oriented portions of Example 12 is arranged.

As shown in FIG. 9, the non-oriented portions 21a were formed in a curved wavy shape with a width in the longitudinal direction (long side) of 20 mm and a width of the end portion (short side) of 2 mm. In addition, the pair of non-oriented portions 21a was provided in such a manner that the respective short sides faced each other and the distance between the facing short sides (proximity distance) was 2 mm.

Example 13

In Example 13, the package 1 and the film 11 having the following structures were used. The materials of the crystalline stretched oriented film 21, the adhesive layer 22, and the sealant film 23 as well as the shape of the package 1 were the same as those in Example 1.

Figure 10:
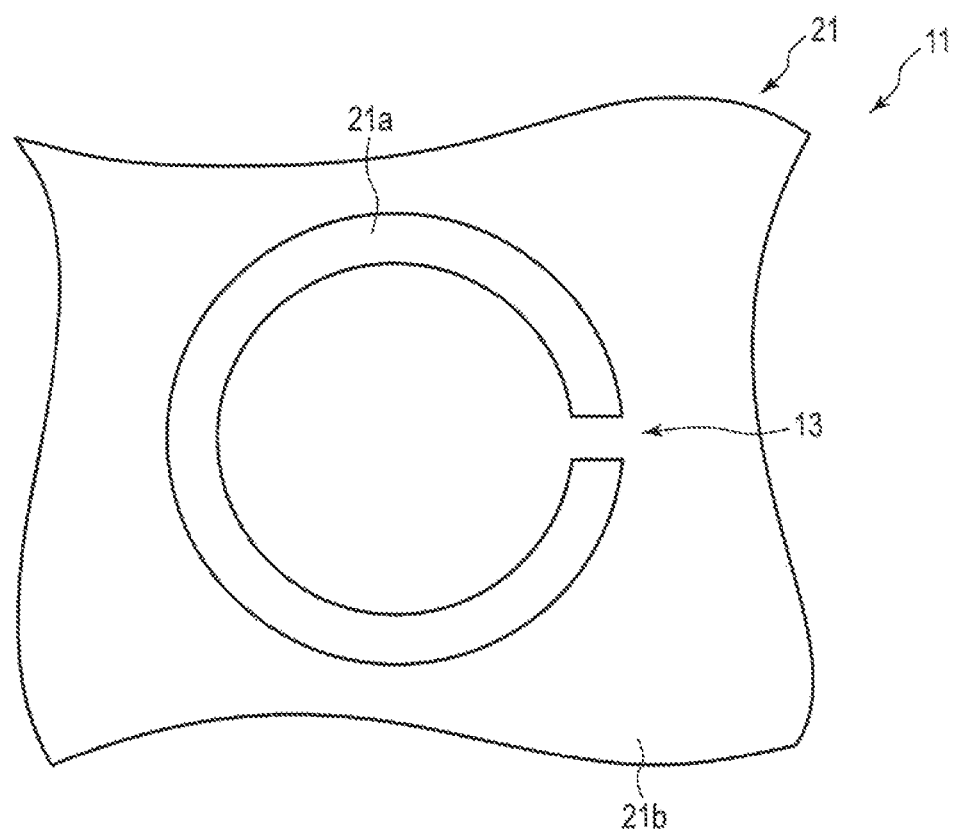
FIG. 10 is a plan view illustrating a structure of a breaking portion of a package in which a pair of non-oriented portions of Example 13 is arranged.

As shown in FIG. 10, the non-oriented portion 21a was formed in an annular shape in which a part was notched, and the non-oriented portion 21a had a length in the circumferential direction (long side) of 60 mm and a width of the end portion (short side) of 1.5 mm with the short sides facing each other and the distance between the facing short sides (proximity distance) being 1 mm.

Comparative Example 1

The package 1 and the film 11 of Comparative Example 1 had the following structures. The materials of the crystalline stretched oriented film 21, the adhesive layer 22, and the sealant film 23 as well as the shapes of the non-oriented portion 21a and the package 1 were the same as those in Example 1, but the distance between the facing short sides of the pair of non-oriented portions 21a (proximity distance) was 5 mm.

Comparative Example 2

As shown in FIG. 12, the package 1 and the film 11 of Comparative Example 2 had the following structures. The materials of the crystalline stretched oriented film 21, the adhesive layer 22, and the sealant film 23 as well as the shapes of the non-oriented portion 21a and the package 1 were the same as those in Example 1, but only one non-oriented portion 21a having a rectangular shape that is long in one direction was provided.

Comparative Example 3

As shown in FIG. 12, the package 1 and the film 11 of Comparative Example 3 had the following structures. The materials of the crystalline stretched oriented film 21, the adhesive layer 22, and the sealant film 23 as well as the shapes of the non-oriented portion 21a and the package 1 were the same as those in Example 1, but the pair of non-oriented portions 21a was formed with the respective long sides facing each other and the distance between the facing long sides being 1 mm.

Comparative Example 4

As shown in FIG. 12, the package 1 and the film 11 of Comparative Example 4 had the following structures. The materials of the crystalline stretched oriented film 21, the adhesive layer 22, and the sealant film 23, the arrangement of the non-oriented portions 21a, and the shape of the package 1 were the same as those in Comparative Example 3, but the length of the long side of the non-oriented portion 21a was 8 mm.

Comparative Example 5

As shown in FIG. 12, the package 1 and the film 11 of Comparative Example 5 had the following structures. The materials of the crystalline stretched oriented film 21, the adhesive layer 22, and the sealant film 23 as well as the shape of the package 1 were the same as those in Comparative Example 3, but the non-oriented portions 21a had a quadrangular shape with four sides equal in length with one side being 5 mm, and the pair of non-oriented portions 21a was arranged in such a manner that respective one sides of the pair of non-oriented portions 21a faced each other. The distance between the facing sides of the pair of non-oriented portions 21a was 1 mm.

Results of Evaluation Test 1

As shown in FIGS. 11 and 12, in all of Examples 1 to 13, the oriented portion 21b between the short sides of the non-oriented portion 21a or between the short side and the long side of the non-oriented portion 21a was broken, and the steam port 21c was formed, whereby stable steam releasing was achieved. The steam port 21c was a relatively small hole, the largest width of which is shown in FIGS. 11 and 12.

In contrast, in Comparative Example 1, at the time of microwave oven heating, the entire region of one of the non-oriented portions 21a was broken with a loud noise, and stable steam releasing was not possible.

In Comparative Examples 2 to 5, at the time of microwave oven heating, the package 1 was broken with a loud noise, but the portion between the pair of non-oriented portions 21a was not broken.

The results of Evaluation Test 1 show that the structure of the package 1 according to the present embodiment enables stable steam releasing and formation of the steam port 21c by breakage of the breaking portion 13.

Evaluation Test 2

Evaluation Test 2 evaluated the gas barrier properties of the film 11 according to the present embodiment through Tests 2-1 and 2-2.

Test 2-1

For the crystalline stretched oriented film 21, the film (UNITIKA LTD.: EMBLEM HG) in which one side of the biaxially stretched nylon film having a thickness of 15 μm was coated with the gas barrier layer was used. For the sealant film 23, the linear low density polyethylene (hereinafter, LLDPE) film (TOYOBO CO., LTD.: L-6100) having a thickness of 50 μm was used, and they were bonded with the gas barrier layer inside using a urethane-based dry laminate adhesive, followed by aging for 3 days in a thermostatic chamber at 38° C., thereby obtaining the film 11. The crystalline stretched oriented film 21 of the film 11 was heated to the melting point by a carbon dioxide gas laser to form a pair of rectangular non-oriented portions 21a that is long in one direction and has a long side of 15 mm and a short side of 2 mm. As shown in FIG. 4, the pair of non-oriented portions 21a was arranged linearly such that the respective short sides faced each other, and the distance between the facing short sides of the pair of non-oriented portions 21a (proximity distance) was 1 mm. The film 11 of Example 14 was prepared in this manner. Prior to Test 2-1, a package 1 using the film 11 was prepared, and it was confirmed by the same evaluation as that of Example 1 of Evaluation Test 1 that the steam escaped without any problem.

For Comparative Example 6, a film 11 of the same material as that of Example 14 was irradiated with a carbon dioxide gas laser, and as shown in FIG. 13, a film 11A including an outer layer removed portion 21d was formed by removing the crystalline stretched oriented film 21 in a size of 0.15 mm in width and 40 mm in length.

In addition, a film 11B made of the same material as in Example 14 and including no non-oriented portion 21a was prepared as a blank 1. The film 11B has a structure in which the non-oriented portion 21a of the film 11 is not included, and illustration thereof is omitted.

For the film 11 of Example 14, the film 11A of Comparative Example 6, and the film 11B of the blank 1, they were set in the gas permeability measuring apparatus "GTR-30XA1BD" manufactured by GTR TEC Corporation under conditions of 23° C.×0% RH according to JIS K-7126-1, and the oxygen permeability (cc/m²·day·atm) was measured. At this time, the oxygen permeability was measured at the non-oriented portion 21a of the film 11, the region 21d where the outer layer was removed (outer layer removed portion) of the film 11A, and the discretionary region of the film 11B. The permeation area at the time of measurement is a circular region having a diameter of 4.4 cm, i.e., a circular region having an area of 15.12 cm², and the area of the non-oriented portion 21a of Example 14 is approximately 0.6 cm², and therefore the ratio of the linear non-oriented portion area to the permeation area is 4%. On the other hand, the area of the region 21d where the outer layer is removed of Comparative Example 6 is approximately 0.06 cm², and therefore the ratio of the area of the region 21d where the outer layer is removed to the permeation area is 0.4%.

Results of Test 2-1

The oxygen permeability measured in Example 14 was 1.39 (cc/m²·day·atm). On the other hand, the oxygen permeability measured in the blank 1 was 1.01 (cc/m²·day·atm), and the oxygen permeability measured in Comparative Example 6 was 15.38 (cc/m²·day·atm). The oxygen permeability of the film 11 of Example 14 provided with the non-oriented portion 21a was slightly increased but substantially the same level as that of the film 11B of the blank 1 not provided with the non-oriented portion 21a, whereas the oxygen permeability of the film 11A of Comparative Example 6 provided with the region 21d where the outer layer was removed was greatly increased.

Test 2-1 shows that even if the non-oriented portion 21a is provided, the oxygen permeability rarely increases.

Test 2-2

For Example 15, a film 11 including the non-oriented portion 21a was prepared using the same method, materials and shapes as those in Test 2-1 except that the crystalline stretched oriented film 21 was a coextruded biaxially stretched film (GUNZE LIMITED: HPB) having a thickness of 15 μm formed of NY/EVOH/NY. For the film 11 of Example 15, in the same manner as in Example 14, prior to Test 2-2, a package 1 using the film 11 was prepared, and it was confirmed by the same evaluation as that of Example 1 of Evaluation Test 1 that the steam port 21c was formed and the steam escaped.

For Comparative Example 7, as shown in FIG. 14, a film 11A having an outer layer cut portion 21e of Comparative Example 7 was prepared by coating the crystalline stretched oriented film 21 with a release agent 51, providing the outer layer cut portion 21e obtained by cutting the crystalline stretched oriented film 21 with a cutter to a length of 40 mm in a region where the release agent 51 was provided, causing the surface coated with the release agent 51 to face the sealant film 23, and bonding it to the sealant film 23 with the adhesive layer 22. For the sealant film 23, a linear low-density polyethylene (hereinafter, LLDPE) film (TOYOBO CO., LTD.: L-6100) having a thickness of 50 μm was used. In the same manner as in Test 2-1, a film 11B having the same structure as that in Example 15 and including no non-oriented portion 21a was prepared as a blank 2.

In the same manner as in Test 2-1, the film 11 of Example 15, the film 11A of Comparative Example 7, and the film 11B of the blank 2 were set in the gas permeability measuring apparatus "GTR-30XA1BD" manufactured by GTR TEC Corporation under conditions of 23° C.×0% RH according to JIS K-7126-1, and the oxygen permeability (cc/m$^2$·day·atm) was measured. At this time, the oxygen permeability was measured at the non-oriented portion 21a of the film 11, the region 21 including the outer layer cut portion 21e of the film 11A, and the discretionary region of the film 11B.

Results of Test 2-2

The oxygen permeability measured in Example 15 was 1.61 (cc/m$^2$·day·atm). On the other hand, the oxygen permeability measured in the blank 2 was 1.54 (cc/m$^2$·day·atm), and the oxygen permeability measured in Comparative Example 7 was 8.05 (cc/m$^2$·day·atm). The oxygen permeability of the film 11 of Example 15 provided with the non-oriented portion 21a was slightly increased but substantially the same level as that of the film 11B of the blank 2 not provided with the non-oriented portion 21a, whereas the oxygen permeability of the film 11A of Comparative Example 7 provided with the outer layer cut portion 21e was greatly increased.

The results of Test 2-2 show that even if the non-oriented portion 21a is provided, the oxygen permeability rarely increases, as in Test 2-1.

Results of Evaluation Test 2

As is apparent from the results of Tests 2-1 and 2-2 described above, it has been clarified that according to the film 11 and the package 1 of the present embodiment, even when the non-oriented portion 21a is provided, the oxygen permeability is not increased, and a suitable gas barrier property is provided.

According to the package 1 formed as described above, the internal pressure can be stably released without generating a loud noise at the time of microwave oven heating, and a suitable gas barrier property can be obtained.

Note that the present invention is not limited to the above-described embodiment. Hereinafter, other embodiments of the present invention will be described.

Second Embodiment

Figure 15:
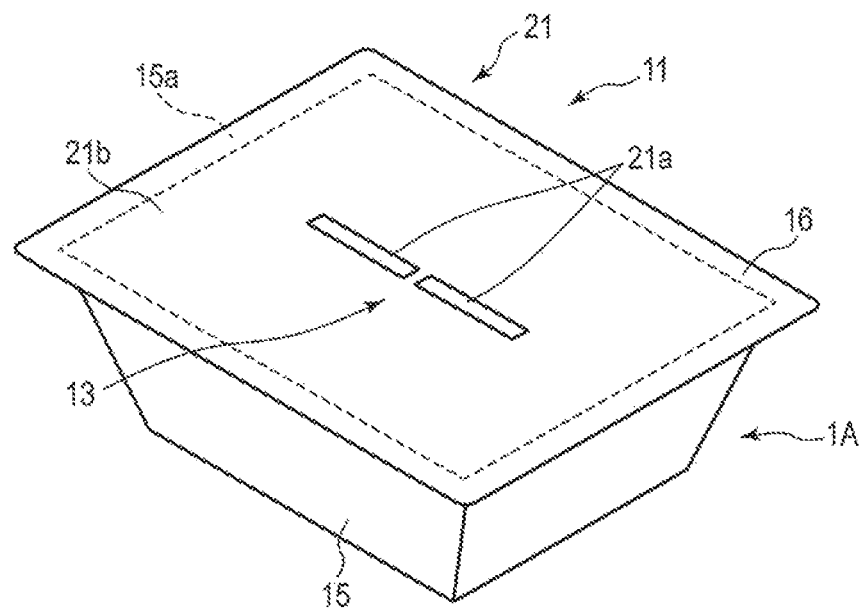
FIG. 15 is a perspective view illustrating a structure of a package according to a second embodiment of the present invention.
Figure 16:
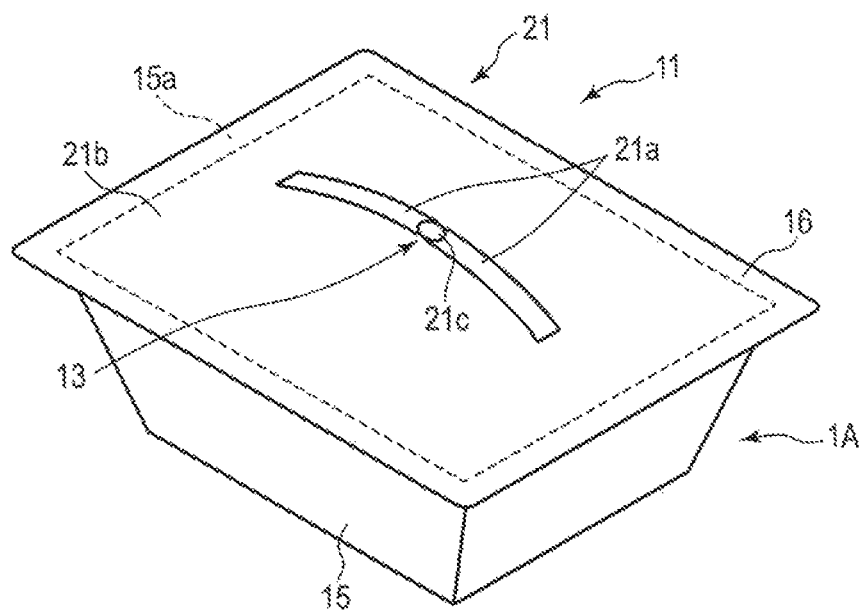
FIG. 16 is a perspective view illustrating an example of use of the package.

Next, with reference to FIGS. 15 and 16, a package 1A according to the second embodiment of the present invention will be described. As shown in FIGS. 15 and 16, the package 1A includes a bottom-containing cylindrical resin container 15, and a lid 16 covering an opening of the resin container 15, in which a film 11 is used for the lid 16. That is, the package 1A uses the film 11 provided with a breaking portion 13 as the lid covering the opening of the resin container 15.

The resin container 15 is, for example, formed in a bottom-containing rectangular frustum shape, and has a flange portion 15a at the opening. The lid 16 is adhered, by heat sealing, to the flange portion 15a of the resin container 15 containing the content. The lid 16 is formed by the film 11 in the form of the flange portion 15a, and the breaking portion 13 is disposed at the center.

The results of Evaluation Test 1 carried out using the package 1A will be shown below.

For the crystalline stretched oriented film 21, the biaxially stretched polyethylene terephthalate (PET) film (TOYOBO CO., LTD.: E5100) having a thickness of 12 μm was used, for the sealant film 23, the easy peel film (DIC Corporation: E3701T) having a thickness of 50 μm was used, and for the adhesive layer 22, a urethane-based dry laminate adhesive was used to bond them, and thereafter aging was carried out in a thermostatic chamber at 38° C. for 3 days to prepare a film 11. By applying a carbon dioxide gas laser to the film 11, a pair of non-oriented portions 21a was provided to have a long side of 20 mm and a short side of 1 mm in such a manner that the non-oriented portions 21a were arranged in the same straight line with the respective short sides facing each other with a gap of 1 mm therebetween. This film 11 was cut into a size of 115 mm×115 mm so that the pair of non-oriented portions 21a were at the center, and the lid 16 was prepared.

In addition, a PP square container of 110 mm×110 mm and having a depth of 30 mm was used for the resin container 15, a tissue that was soaked in 10 g of tap water was put therein, and the lid 16 was heat-sealed and welded to the opening of the resin container 15 to seal the resin container 15. The packaging container was heated in a microwave oven [Hitachi, Ltd.: MRO-MS7] under the condition of an output of 500 W. As a result, the region including the non-oriented portions 21a (breaking portion) stretched in association with an increase in the internal pressure in the package 1A, the steam port 21c was formed by breakage of the region including the oriented portion 21b between the short sides of the pair of non-oriented portions 21a, and water vapor was released from the steam port 21c. At this time, the width of the steam port 21c was 2 mm.

The package 1A formed as described above has the same effects as those of the package 1 described above. Further, in the package 1A, since the breaking portion 13 is provided at the center of the lid 16, the portion where steam is released is not the flange portion 15a, and therefore the flange portion 15a is not heated by steam. As a result, the user can take the package 1A with the flange portion 15a after heating, and therefore, usability is improved.

Third Embodiment

Next, a film 11C used for the package 1 or 1A according to the third embodiment of the present invention will be described with reference to FIGS. 17 and 18. In the structures of the film 11C according to the third embodiment, the same components as those of the film 11 according to the above-described first and second embodiments are denoted by the same reference numerals, and detailed description thereof is omitted.

The film 11C is formed in a shape that can be used for the package 1 or 1A. As shown in FIGS. 17 and 18, the film 11C includes a crystalline stretched oriented film 21, an adhesive layer 22, and a sealant film 23 from the outer surface side of the package 1 when formed. Further, the film 11C includes a laser light absorbing portion 24.

The laser light absorbing portion 24 is a portion having a high absorbing property of laser light emitted. For example, the laser light absorbing portion 24 is formed by printing of ink and the like having a high laser light absorbing property. As a specific example, the laser light absorbing portion 24 is a black printed portion on which ink containing carbon black for improving laser absorbing property is printed. The laser light absorbing portion 24 is provided, for example, in a region where the non-oriented portion 21a is formed on the surface facing the adhesive layer 22 of the crystalline stretched oriented film 21, before the non-oriented portion 21a is formed.

The crystalline stretched oriented film 21 includes a non-oriented portion 21a formed by heating the laser light absorbing portion 24 to a temperature equal to or higher than the melting point by laser light. The non-oriented portion 21a constitutes a part of the breaking portion 13. The non-oriented portion 21a is formed into various shapes depending on the structure of the breaking portion 13.

For the method of preparing the film 11C formed as described above, for example, first, an ink containing carbon black or the like is printed on a region of the crystalline stretched oriented film 21 where the non-oriented portion 21a is formed, thereby forming the laser light absorbing portion 24. At this time, for example, if a pair of non-oriented portions 21a that is long in one direction and aligned in the longitudinal direction is formed, rectangular laser light absorbing portions 24 which are long in one direction are formed at two sections aligned in the longitudinal direction so as to form a region of the pair of non-oriented portions 21a or a region slightly larger in the width direction than the above-described region.

Next, the crystalline stretched oriented film 21 and the sealant film 23 are bonded via the adhesive layer 22. Next, a laser light output device 100 for outputting the laser light 101 is adjusted to adjust the laser light 101 to an output at which the crystalline stretched oriented film 21 is not heated to the melting point or higher and is heated to the melting point or higher in the laser light absorbing portion 24. Next, the laser light output device 100 is controlled to scan the laser light absorbing portion 24.

Figure 17:
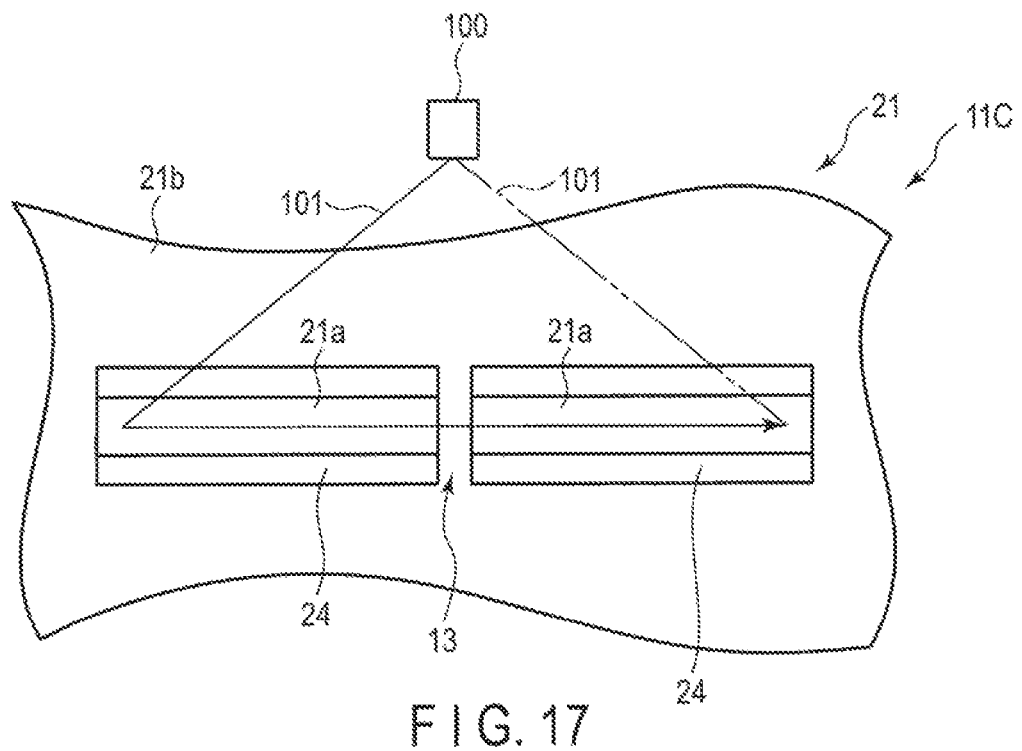
FIG. 17 is a plan view illustrating a structure of a film according to a third embodiment of the present invention.
Figure 18:
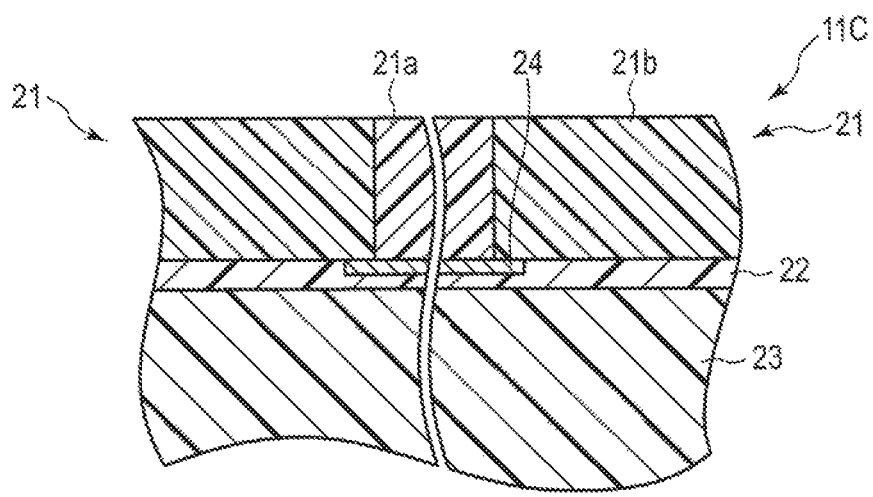
FIG. 18 is a cross-sectional view illustrating a structure of the film.

At this time, as shown by an arrow in FIG. 17, the laser light 101 is scanned once from one laser light absorbing portion 24 to the other laser light absorbing portion 24 through the oriented portion 21b between the pair of laser light absorbing portions 24. As a result, in the region of the laser light absorbing portion 24, the crystalline stretched oriented film 21 is heated to the melting point to form the non-oriented portion 21a, and in the region where the laser light absorbing portion 24 is not provided, the crystalline stretched oriented film 21 is not melted and remains oriented. By these steps, the film 11C used for the package 1 is prepared and can be used for any package 1 or 1A.

According to the film 11C formed as described above, the same effects as those of the film 11 according to the first embodiment can be obtained. Further, for the film 11C, by providing the laser light absorbing portion 24 in the region where the non-oriented portion 21a is provided, the laser light 101 may be scanned only once as shown in FIG. 17.

More specifically, when laser light is scanned in order to provide two non-oriented portions 21, scanning is required twice. However, as in the film 11C, by providing the laser light absorbing portion 24 and adjusting the output of the laser light 101 so that the crystalline stretched oriented film 21 is melted only in the laser light absorbing portion 24, it is possible to form two non-oriented portions 21a by a single scan. Thus, since the number of scans of the laser light 101 can be reduced, the production efficiency of the film 11C can be improved, and the accuracy of the non-oriented portion 21a to be formed can be improved.

For the package 1 using the film 11C, Evaluation Test 1 carried out in the first embodiment was carried out as follows. In the film 11C, for the crystalline stretched oriented film 21, a biaxially stretched polyethylene terephthalate (PET) film (TOYOBO CO., LTD.: E5100) having a thickness of 12 µm was used, and one side of the film was coated with black ink (OSAKA PRINTING INK MFG. CO., LTD.: LB-5 type) containing carbon black, thereby forming laser light absorbing portions 24 having a long side of 20 mm and a short side of 2 mm with the respective short sides facing each other with a gap of 1 mm therebetween. At this time, the direction parallel to the flow direction of the film was the long side direction. Further, for the sealant film 23, an LLDPE film (TOYOBO CO., LTD.: L4102) having a thickness of 40 µm was used, and for the adhesive layer 22, a urethane-based dry laminate adhesive was used to bond the sealant film 23 to the surface of the crystalline stretched oriented film 21 on which the laser light absorbing portions 24 were provided, and thereafter aging was carried out in a thermostatic chamber at 38° C. for 3 days to prepare the film 11C.

In the film 11C, by a carbon dioxide gas laser, the laser light absorbing portions 24 can melt and heat the crystalline stretched oriented film 21 from the center portion in the short side direction at the end of one laser light absorbing portion 24 of the crystalline stretched oriented film 21 toward the center portion in the short side direction at the end of the other laser light absorbing portion 24, but the portion not coated with the laser light absorbing portions 24 was scanned with the laser light 101 with the output at which the portion is not melted or heated, thereby forming a pair of non-oriented portions 21a having a long side of 20 mm and a short side of 1 mm with the distance between the short sides being 1 mm. At this time, it was confirmed that the oriented portion 21b located between the facing short sides or between the facing short and long sides of the non-oriented portions 21a was formed, i.e., the non-oriented portion 21a was not formed in the portion irradiated with the laser light 101 but not coated with the laser light absorbing portion 24. Using this film 11C, a pillow packaging bag having a size of 160 mm×260 mm as shown in FIG. 1 was prepared as the package 1.

Evaluation Test 1 shows that when microwave oven heating was carried out using the film 11C for the package 1, the steam port 21c was formed in the oriented portion 21b located between the facing short sides or between the facing short and long sides of the non-oriented portion 21a, and the steam was discharged. The width of the steam port 21c was 2 mm. As is apparent from this, it has been clarified that the film 11C has the same effects as those of the film 11.

Fourth Embodiment

Figure 19:
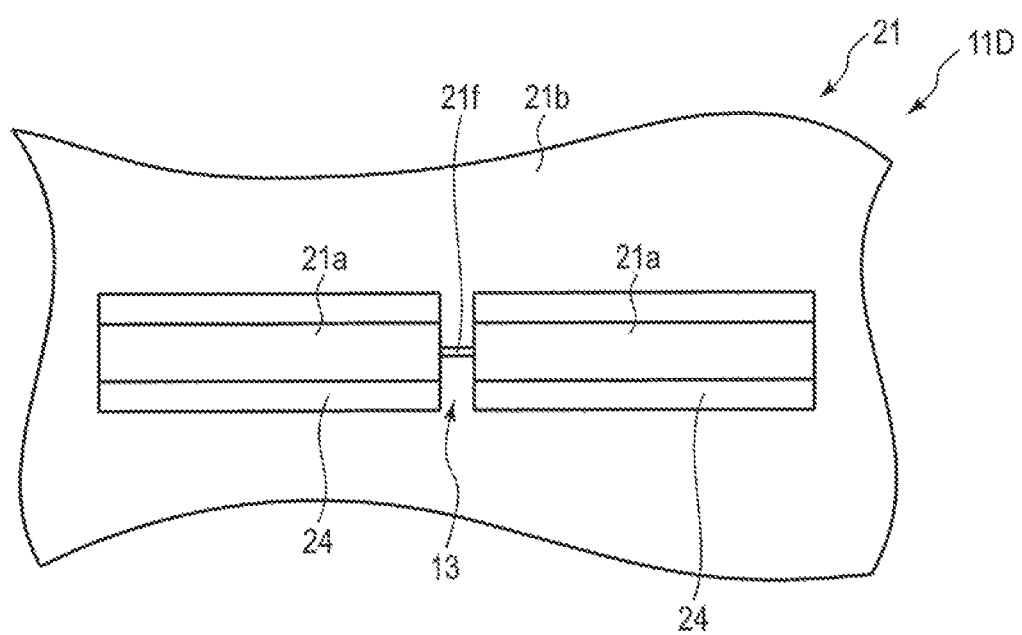
FIG. 19 is a plan view illustrating a structure of a film according to a fourth embodiment of the present invention.

Next, a film 11D used for the package 1 or 1A according to the fourth embodiment of the present invention will be described with reference to FIG. 19. In the structures of the film 11D according to the fourth embodiment, the same components as those of the film 11 according to the above-described first and second embodiments and the film 11C according to the third embodiment are denoted by the same reference numerals, and detailed description thereof is omitted.

The film 11D is formed in a shape that can be used for the package 1 or 1A. As shown in FIG. 19, the film 11D includes a crystalline stretched oriented film 21D, an adhesive layer 22, and a sealant film 23 from the outer surface side of the package 1 when formed.

Further, for example, the film 11D includes a laser light absorbing portion 24.

The crystalline stretched oriented film 21D includes non-oriented portions 21a, and a continuous portion 21f that is continuous between the facing short sides or between the short side and the long side of the non-oriented portions 21a.

The continuous portion 21f is a portion formed to be non-oriented by melting the crystalline stretched oriented film 21. The continuous portion 21f constitutes a part of the breaking portion 13. The continuous portion 21f is provided in a part of the oriented portion 21b between the facing short sides or between the short side and the long side of the non-oriented portions 21a. That is, the continuous portion 21f is formed to have a width smaller than the width of the short side of the non-oriented portion 21a.

For the method of preparing the film 11D formed as described above, for example, first, ink containing carbon black or the like is printed on a region of the crystalline stretched oriented film 21 where the non-oriented portion 21a is formed, thereby forming laser light absorbing portions 24. At this time, for example, if a pair of non-oriented portions 21a that is long in one direction and aligned in the longitudinal direction is formed, rectangular laser light absorbing portions 24 which are long in one direction are formed at two sections aligned in the longitudinal direction so as to form a region of the pair of non-oriented portions 21a or a region slightly larger in the width direction than the above-described region.

Next, the crystalline stretched oriented film 21 and the sealant film 23 are bonded via the adhesive layer 22. Next, a laser light output device 100 for outputting the laser light 101 is adjusted to adjust the laser light 101 to an output at which the crystalline stretched oriented film 21 is heated to the melting point or higher. Next, the laser light output device 100 is controlled to scan the laser light absorbing portion 24.

At this time, the laser light 101 is scanned once from one laser light absorbing portion 24 to the other laser light absorbing portion 24 through the oriented portion 21b between the pair of laser light absorbing portions 24. As a result, in the region of the laser light absorbing portion 24, the crystalline stretched oriented film 21 is heated to the melting point to form the non-oriented portion 21a having a width wider in the short side direction, and in the region where the laser light absorbing portion 24 is not provided, the continuous portion 21f having a width narrower than that of the non-oriented portion 21a is formed. By these steps, the film 11D used for the package 1 is prepared and can be used for any package 1 or 1A.

According to the film 11D formed as described above, similarly to the film 11 according to the first embodiment, the continuous portion 21f breaks in the breaking portion 13 of the film 11 at the time of microwave oven heating, and the steam port 21c is formed. It is considered that this is because when the internal pressure in the package 1 or 1A increases during microwave oven heating and the crystalline stretched oriented film 21 stretches, the continuous portion 21f breaks first since the absolute value of the elongation amount of the continuous portion 21f is smaller than that of the non-oriented portion 21a because of the width of the continuous portion 21f being smaller than that of the non-oriented portion 21a.

The method of forming the non-oriented portion 21a and the continuous portion 21f is not limited to laser light heating, and a method such as hot plate heating, impulse heating, or near-infrared heating can be used, and when such a method is used, the laser light absorbing portion 24 may not be provided. For example, if hot plate heating is used, the hot plate may be formed to have a shape of the non-oriented portion 21a and the continuous portion 21f. Further, if the non-oriented portion 21a and the continuous portion 21f are formed by any of the methods, the location of the continuous portion 21f may be the center in the width direction of the short side or one end in the same width direction as long as the breaking portion 13 has the structure in which the oriented portion 21b and the continuous portion 21f are arranged between the short sides and between the short and long sides of the non-oriented portions 21a. In addition, the film 11D provided with such a continuous portion 21f has a high degree of freedom; because even when the non-oriented portion 21a has a shape of Comparative Examples 3 to 5 described above, by providing the continuous portion 21f, the continuous portion 21f breaks during microwave oven heating, and the steam port 21c can be formed.

Note that the present invention is not limited to the embodiments described above. For example, in the above-described examples, the package is the pillow packaging bag of the package 1, or the package 1A including the resin container 15 and the lid 16, but the present invention is not limited to this, and as long as the package constitutes a sealed space for containing the content, and the film 11, 11C or 11D stretches due to an increase of the internal pressure of the package 1 or 1A, the shape of the package can be set as appropriate, and the film 11 can be used for the package.

Examples of another package shape include a flat pouch with a three-sided seal, a flat pouch with a half-folded seal, a gusset pouch, and a standing pouch.

In the above-described examples, the film 11, 11C, or 11D is used for the package 1 or 1A, but the present invention is not limited to this, and it may be distributed in the market as the film 11 used for the package 1 or 1A, and the like. Further, in the above-described examples, one breaking portion 13 is provided in the package 1 or 1A, but the same effect can be obtained with the film 11 in which a plurality of breaking portions 13 are provided. Further, in the above-described examples, the film 11 is a laminated film having a laminated structure, but the present invention is not limited to this. For example, the film 11 may be a single-layer crystalline stretched oriented film 21 in which a breaking portion 13 having a non-oriented portion 21a is formed, or may be a laminated film having a multilayer structure other than the above-described layer structure.

That is, the present invention is not limited to the above-described embodiments, and in the practical stage, various modifications may be made without departing from the spirit of the invention. Furthermore, the embodiments may be appropriately combined and implemented, and in that case, the combined effects may be obtained. Furthermore, the above-described embodiments include inventions of various stages, and various inventions may be extracted by appropriately combining the plurality of components disclosed herein. For example, even if some components are removed from all the components shown in the embodiment, if the problem can be solved and the advantageous effects stated can be achieved, a configuration from which the components have been removed can be extracted as an invention.

What is claimed is:

1. A package, comprising:
    a film including a crystalline stretched oriented film;
    a breaking portion provided in the film, and including one or more non-oriented portions formed by heating a part of the crystalline stretched oriented film at a temperature equal to or higher than a melting point of the crystalline stretched oriented film, the one or more non-oriented portions facing each other with an oriented portion of the crystalline stretched oriented film interposed therebetween,
    wherein the one or more non-oriented portions each comprise a short side and a long side, and are arranged such that the short sides are close to each other with the oriented portion interposed therebetween, or the short side and the long side are close to each other with the oriented portion interposed therebetween; and wherein a breaking elongation of the non-oriented portions is greater than a breaking elongation of the oriented portion.

2. The package according to claim 1, wherein a distance between the short sides or a distance between the short side and the long side of the non-oriented portions is less than 5 mm.

3. The package according to claim 2, wherein a pair of the non-oriented portions is formed linearly such that the respective short sides face each other.

4. The package according to claim 1, wherein the breaking portion includes a non-oriented continuous portion provided between the short sides or between the short side and the long side of the non-oriented portions, and having a width narrower than a width of the non-oriented portion.

5. A film, comprising:
a crystalline stretched oriented film;
a breaking portion including one or more non-oriented portions formed by heating a part of the crystalline stretched oriented film at a temperature equal to or higher than a melting point of the crystalline stretched oriented film, the one or more non-oriented portions facing each other with an oriented portion of the crystalline stretched oriented film interposed therebetween;

wherein the one or more non-oriented portions each comprise a short side and a long side, and are arranged such that the short sides are close to each other with the oriented portion interposed therebetween, or the short side and the long side are close to each other with the oriented portion interposed therebetween; and wherein a breaking elongation of the non-oriented portions is greater than a breaking elongation of the oriented portion.

6. The film according to claim 5, wherein a distance between the short sides or a distance between the short side and the long side of the non-oriented portions is less than 5 mm.

7. The film according to claim 6, wherein a pair of the non-oriented portions is formed linearly such that the respective short sides face each other.

8. The film according to claim 5, wherein the breaking portion includes a non-oriented continuous portion provided between the short sides or between the short side and the long side of the non-oriented portions, and having a width narrower than a width of the non-oriented portion.

* * * * *